May 3, 1938. W. C. HIERING 2,116,242
BAG FRAME
Filed Feb. 26, 1937
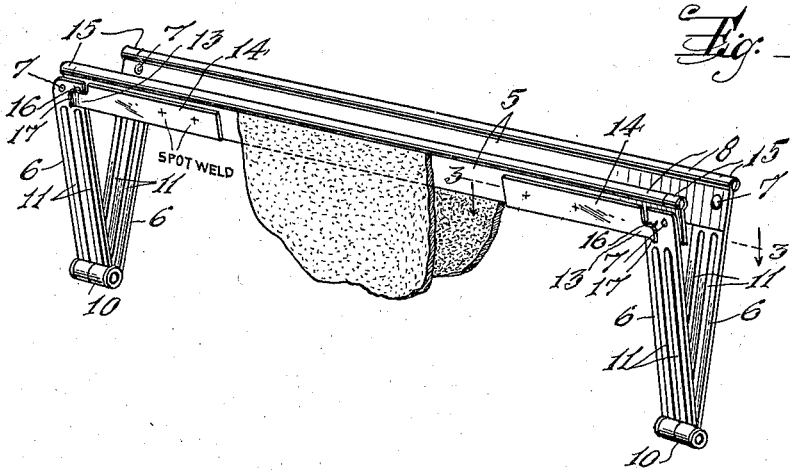
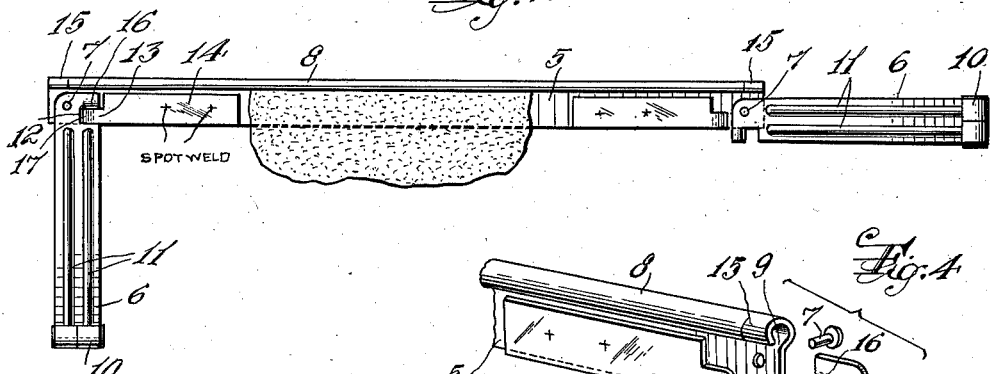
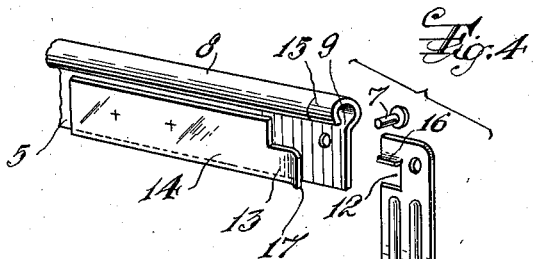
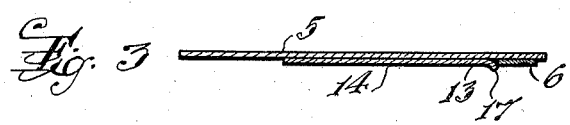
INVENTOR
William C. Hiering.
BY Fredk C. Fischer
ATTORNEY Patented May 3, 1938

2,116,242

UNITED STATES PATENT OFFICE 2,116,242

BAG FRAME

William C. Hiering, Newark, N. J., assignor to The J. E. Mergott Company, Newark, N. J., a corporation of Delaware Application February 26, 1937, Serial No. 127,859

6 Claims. (Cl. 150—29)

This invention relates to bag frames and more particularly to improvements which facilitate the attaching of bag covering material to bag frames.

In the manufacture of ladies' hand bags, it is highly desirable to minimize the amount of labor necessary in assembling the various parts of the bag so that the final cost of the hand bag will be relatively low.

Heretofore the attaching of bag covering material to a frame has required skill and care and an appreciable amount of time on the part of the assembler, thus creating a labor cost which greatly affected the final cost of the bag.

It is an object of this invention to provide a hand bag frame to which bag covering material can be easily and readily attached in a short period of time.

A further object is the provision of a hand bag frame, substantially U-shaped, in which the legs of each U-shaped frame member are pivoted to a cross-member so that they can be placed in alignment with the cross member, when desired, for the purpose of facilitating the attaching of bag covering material to the cross member.

These and other advantageous objects, which will later appear are accomplished by the simple and practical construction and arrangement of parts hereinafter described and exhibited in the accompanying drawing, forming part hereof, and in which:

Fig. 1 is a perspective view of a hand bag frame embodying my invention,

Fig. 2 is a plan view of a frame member embodying the invention, showing one of the legs thereof in alignment with the cross member, Fig. 3 is a sectional view taken on line 3—3 of Fig. 1, and Fig. 4 is an exploded view, in perspective, of a portion of the frame member.

Referring to the drawing, in Fig. 1, the hand bag frame is shown to include two U-shaped frame members, each of which comprises a cross-member 5 and legs 6 pivoted by means of pins 7 to the ends of the cross-members 5. The cross member 5 has the upper end thereof formed into a cylindrical bead 8 having the free edge thereof spaced from the main portion to provide an opening 9 through which bag covering material can be inserted in the bead 8. The adjacent legs 6 of the two frame members are hingedly connected at 10, each leg being a flat sheet of metal provided with reenforcing ribs 11.

Adjacent the pivot 7, each leg 6 is provided with a notch 12, into which snaps a projection 13 when the leg 6 is moved at right angles to the cross member 5. The projection 13 is integral with a leaf-spring 14, which is attached to the cross-member 5 by any suitable means, such as spot welding or rivets.

In attaching bag covering material to a frame member, the leaf-springs 14 are raised to move the projection 13 out of the notch 12 so that the legs 6 can be placed in alignment with the cross-member 5.

The edge of the bag covering material is then inserted through the opening 9 into the bead 8, and held firmly in place by crimping the end portions 15 of the bead 8 onto the bag covering material.

The leaf spring 14 is then released and the leg 6 rotated to a position at right angles to the cross-member 5 so that the projection 13 will snap into the notch 12 and prevent movement of the leg 6.

Before being attached to the frame, the bag covering material is formed into a bag having gussets at each end thereof, and after the bag covering material has been attached to the frame, the legs 6 are rotated to the position shown in Fig. 1 where they will rest on the outside of the bag over the gussets.

To facilitate raising the leaf-spring 14, the projection 13 is curved slightly as shown at 17, which curved portion also serves as a stop to engage a small stud 16 bent out from the legs 6 at the upper end of the notches 12. When the legs are in a position at right angles to the cross-member 5, the engagement of the curved portions 17 and the studs 16 positively prevents rotation of the legs.

From the above description it will be seen that there has been provided a hand bag frame of relatively simple construction which greatly facilitates the attaching of bag covering material thereto. As described above, the operation of attaching bag material requires only the insertion of the edge of the bag material in the beads 8 and the crimping of the ends of the beads. Obviously, this operation is simple and requires very little time, thus materially decreasing the cost of labor in the manufacture of hand bags, at the same time providing a hand bag of pleasing appearance and strength.

The foregoing disclosure is to be regarded as descriptive and illustrative only, and not as restrictive or limitative of the invention of which obviously embodiments may be constructed, including many modifications without departing from the spirit and scope of the invention set forth in the appended claims.

Having thus described my invention, what I claim as new and desire to secure by Letters Patent, is:

1. In a hand bag frame, a U-shaped frame member comprising a cross-member, leaf springs attached to the cross-member adjacent the ends thereof, legs pivoted to the ends of the cross-member and adapted to be positioned in alignment with said cross member, said legs having notches therein adjacent said pivot, and projections on said leaf springs adapted to snap into said notches to prevent rotation of said legs when the legs are moved to a position at right angles to the cross member.

2. In a hand bag frame, a U-shaped frame member comprising a cross-member, leaf springs attached to the cross-member adjacent the ends thereof, legs pivoted to the ends of the cross-member, said legs having notches therein adjacent said pivot, and projections on said leaf springs adapted to snap into said notches to prevent rotation of said legs when the legs are moved to a position at right angles to the cross member, the upper edge of said cross member being provided with a bead to enable bag covering material to be attached to said cross-member.

3. In a hand bag frame, a pair of U-shaped frame members, each of said frame members having a cross-member and legs pivoted to the ends thereof, said legs being adapted to be positioned in alignment with said cross members adjacent legs of the frame members being hingedly connected, said legs having notches therein adjacent said pivots, and leaf-springs attached to the cross members, said leaf springs having projections adapted to snap into said notches to prevent rotation of said legs when the legs are moved into a position at right angles to the cross member.

4. In a hand bag frame, a frame member comprising a cross-member, legs pivoted to the ends of said cross-member and adapted to be positioned in alignment with said cross members, and means to prevent rotation of said legs when the legs are moved to a position at right angles to the cross member.

5. In a hand bag frame, a frame member comprising a cross member having legs pivoted to the ends thereof, said legs being adapted to be positioned in alignment with said cross member, means to prevent rotation of said legs when moved to a position at right angles to the cross-member, and means for attaching bag covering material to the cross member.

6. In a hand bag frame, a frame member having a cross-member with legs pivoted to the ends thereof, said legs being adapted to be positioned in alignment with said cross member, and spring means mounted on the cross member and engageable with said legs to prevent rotation thereof when the legs are moved to a position at right angles to the cross member.

WILLIAM C. HIERING.